US007308653B2

(12) United States Patent
Lin-Hendel

(10) Patent No.: US 7,308,653 B2
(45) Date of Patent: Dec. 11, 2007

(54) AUTOMATED SCROLLING OF BROWSER CONTENT AND AUTOMATED ACTIVATION OF BROWSER LINKS

(76) Inventor: Catherine Lin-Hendel, 18850 Blythswood Dr., Los Gatos, CA (US) 95030

( * ) Notice: Subject to any disclaimer, the term of this patent is extended or adjusted under 35 U.S.C. 154(b) by 615 days.

(21) Appl. No.: 10/052,692

(22) Filed: Jan. 19, 2002

(65) Prior Publication Data

US 2002/0126155 A1 Sep. 12, 2002

Related U.S. Application Data

(60) Provisional application No. 60/262,998, filed on Jan. 20, 2001.

(51) Int. Cl.
 *G06F 3/00* (2006.01)
(52) U.S. Cl. ............ 715/785; 715/854; 715/784; 715/833; 715/501.1; 709/217
(58) Field of Classification Search .......... 345/786, 345/785; 709/217; 715/784–786, 854, 856, 715/862, 833, 501.1, 512
See application file for complete search history.

(56) References Cited

U.S. PATENT DOCUMENTS

| | | | | |
|---|---|---|---|---|
| 5,196,838 | A * | 3/1993 | Meier et al. ............ | 715/856 X |
| 5,689,284 | A * | 11/1997 | Herget ..................... | 715/856 X |
| 5,874,936 | A * | 2/1999 | Berstis et al. ............. | 345/785 |
| 6,222,541 | B1* | 4/2001 | Bates et al. ............... | 345/786 |
| 6,321,991 | B1* | 11/2001 | Knowles ................. | 235/472.01 |
| 6,334,145 | B1* | 12/2001 | Adams et al. ............ | 709/217 |
| 6,345,764 | B1* | 2/2002 | Knowles ................. | 235/472.01 |
| 6,457,026 | B1* | 9/2002 | Graham et al. ........... | 715/512 |
| 6,462,752 | B1* | 10/2002 | Ma et al. ................ | 715/785 X |
| 6,912,694 | B1* | 6/2005 | Harrison et al. .......... | 715/784 |

* cited by examiner

*Primary Examiner*—X. L. Bautista
(74) *Attorney, Agent, or Firm*—Jean-Marc Zimmerman

(57) ABSTRACT

An automatic scrolling mechanism that converts the passive browser/web/computer media or any other information repository into an active media that can actively present and "push" information to the users/viewers while retaining the browser/web media's existing "pull" and interactivity functions. The same mechanism applied in TV/Video Media can give the TV/Video Media interactivity. The automatic scrolling can be controlled by placing a cursor on various control icons, such as a respective end of a floating border structure. The structure may be a box or a line. Furthermore, the structure may be a cluster of arrows, or other symbols. In operation, while the cursor is on the respective end, automatically scrolling occurs to bring forth the content that extends beyond the field of view of the browser display window into view. As the content is scrolled, the content is moved into the field of view of the browser display window in a predetermine direction designated by the respective end. Sub-windows are also designed to be independently and automatically scrolled or floated with respect to the content of the main browser window. Furthermore, this invention automatically activates links created in an information repository, actively retrieves the linked information, and automatically present and scroll the retrieved information to the users/viewers of the repository. As the content is automatically scrolled, the repository is pushed to the user and allured to further navigate there through the repository.

33 Claims, 17 Drawing Sheets

AUTOMATED SCROLLING OF BROWSER CONTENT AND AUTOMATED ACTIVATION OF BROWSER LINKS

CROSS REFERENCE TO RELATED APPLICATIONS

This application claims priority from the U.S. Provisional Patent Application Ser. No. 60/262,998 filed on Jan. 20, 2001.

FIELD OF THE INVENTION

This invention relates to automatically scrolling parts of, or the entire content information displayed in a browser page. The invention also relates to partitioned display windows within browsers, and more particularly to display windows that include a plurality of structures that can effectuate scrolling through the content or pages of a browser wherein such content or pages extend beyond the limits of a display window.

The invention also relates to preprogramming automated activation of links contained in browser pages, and automated scrolled presentation of the linked information.

BACKGROUND OF THE INVENTION

The two major classes of electronic media formats that present information to viewer of the information are: (1) the television/video format, and (2) the browser/web format. The television/video format actively presents/pushes continually changing information to passive viewers. The browser/web/computer format is passive, requiring a viewer to "pull" information from the storage devices of that media by entering input requests/commands through an input device. In other words, the viewer is required to actively navigate the browser/web/computer format to receive information.

While the television/video format is convenient, requiring no viewer effort, it lacks interactivity. The browser/web/computer format, on the other hand, sits still, is static until a viewer makes an input/request through an input device to request or navigate to certain information. As can be seen, the browser/web/computer format allows for one input/request at a time for one piece of particular information, a procedure that is tedious and tiring.

Referring now to FIG. 1, for browser/web pages 10 wider or longer than display window 12, conventional browsers 14 include vertical scroll arrows 16a and 16b in combination with a vertical scroll bar 16 at the right edge of the browser 14 to move the content up-and-down within the display window 12. Furthermore, horizontal scroll arrows 18a and 18b in combination with a horizontal scroll bar 18 are provided at the bottom edge of the browser 14 to move the content left-and-right within the display window 12.

In operation, the user of a computer may scroll through the content by moving the cursor 20 to one of the scroll bars 16 or 18, pressing down the left key of a mouse and dragging the scroll bar, up, down, left or right, via the mouse. When using the scroll bars 16 or 18, the entire content (top to bottom) is scrolled substantially within the designated dragging area of the display window. Hence, when dragging the scroll bar 16 or 18, a user can gradually, or quickly at the speed of the fingers' dragging motion permits, move to the end of the content by dragging the scroll bar 16 or 18 to a desired point, or to the end of such designated dragging area.

Alternately, the user could scroll in incremental steps or distances up, down, left or right within the content by repeatedly click the left key of the mouse on any one of the scroll arrows 16a, 16b, 18a and 18b. As can be appreciated, these approaches are tedious and finger tiring. Moreover, this approach is even more tiresome when using a mouse-pad to operate the scroll arrows 16a, 16b, 18a and 18b and scroll bars 16 and 18.

In order to access and view additional information linked to a particular browser/web/computer-display page through the "links" contained in the page, the viewer must move the cursor to a particular link (for example, by holding down the left button of a computer "mouse" input device and sliding the "mouse" on a "mouse pad"), and "click" (the mouse left button) or push a button of an input device to request that particular information to be displayed on the display screen. Such operation must be performed one-link at a time, while requiring the viewer to know exactly which "link" to "click" for what information, or to explore, experiment, and guess.

SUMMARY OF THE INVENTION

The present invention contemplates a method of displaying and navigating through repositories of information via a browser by automatically scrolling the content/pages of an information media without requiring user/viewer input. Thus, the repository of information is actively "pushed" to the user, while also allow user to interact with the information and the media. The method automates sequences of blinking links and activates links that contain essential and/or important information to particular sets of viewers/users; and automatically and sequentially presents/pushes such information to particular sets of viewers/users. The same technique can be used to "partition" a TV/video screen and make the TV/video screen "interactive." For example, a model is wearing a particularly stunning dress, you can click on the female figure, and the information, and the purchasing link appears on a separate sub-window. Similarly, if you like the "car" James Bond is driving, or the suit he is wearing, you can do the same.

The present invention also contemplates at least one sub-window inside a browser's main-window that can be independently and automatically or manually scrolled to display content of that sub-window extending beyond the viewing field of that sub-window. Or, the sub-window can remain floating in-place on the computer/browser display screen, while the main page(s) of the browserwindow is automatically or manually scrolled to bring into view the page content that extends beyond the limits of the main browser window.

Furthermore, the present invention contemplates a method of controlling the automatic scrolling within a window or sub-window of a browser/web media page.

BRIEF DESCRIPTION OF THE DRAWINGS

FIGS. 5A-5G illustrate an application of this invention in a Tutorials/Guide environment, where instructions for the user's action is contained in a floating box that remains within viewing field, while the changing content of the Tutorial/Guide is automatically activated and scrolled through the browser window's viewing field.

DETAILED DESCRIPTION OF THE INVENTION

Figure 1:
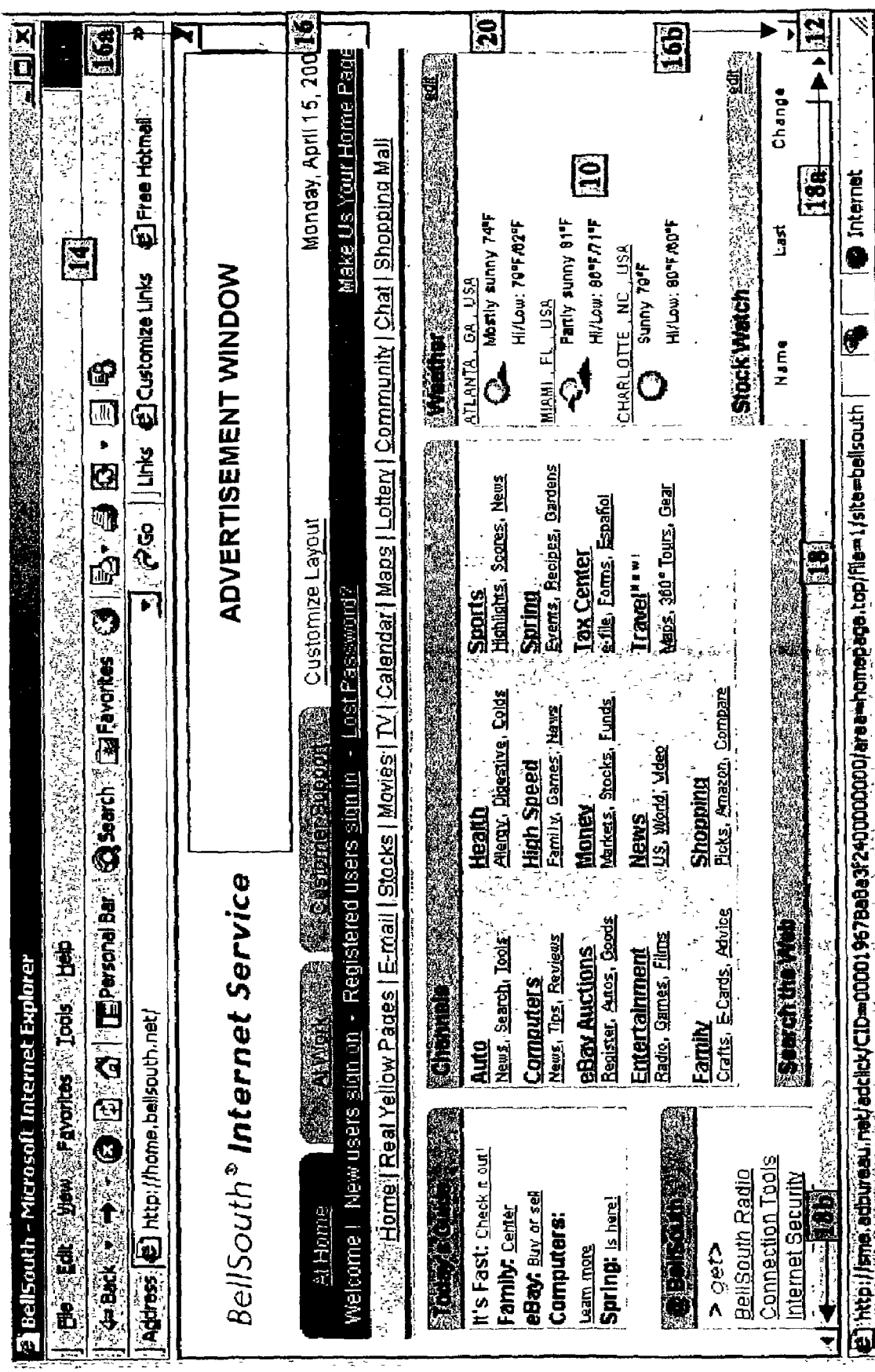
FIG. 1 illustrates a conventional browser in combination with a page presented by the conventional browser.
Figure 2:
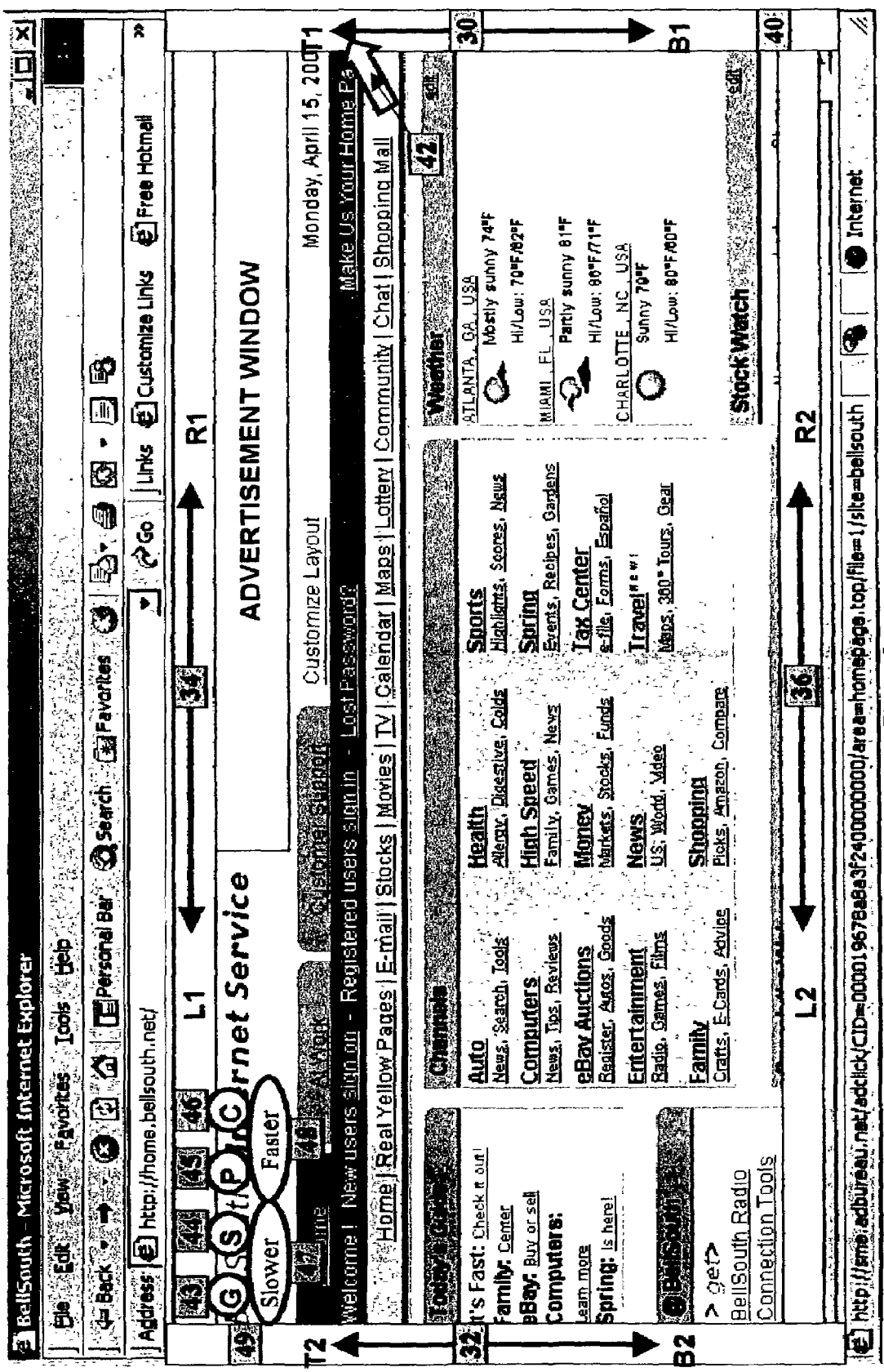
FIG. 2 illustrates the browser, in accordance with the present invention, in combination with a page, containing the floating boarder structure that facilitates user control of the automated scrolling.

Referring now to FIG. 2, the present invention can be added as additional tool, or substitutes for the vertical scroll arrows 16a and 16b in combination with the vertical scroll bar 16 and the horizontal scroll arrows 18a and 18b in combination with the horizontal scroll bar 18 with a first boarder floating structure 30 on the right edge, a second boarder floating structure 32 on left edge, a third boarder floating structure 34 on the top edge and a fourth boarder floating structure 36 on the bottom edge of the display window 40.

In the exemplary embodiment, the first, second, third and fourth boarder floating structures 30, 32, 34 and 36 are floating lines or boxes or other geometric shapes that have designated ends for designating a predetermine scrolling direction. The floating line or floating box is considered floating since it always stays in essentially the same position as the content moves within the field of view. The first, second, third and fourth boarder floating structures 30, 32, 34 and 36 are the user's control vehicle or mechanism for activating and controlling the automatic scrolling function.

In operation, when the cursor 42 is moved onto either of the top end T1, T2 of one of the first and second boarder floating structures 30 and 32, the page is automatically scrolled up (or down) to bring within the field of view the content of the page that extends beyond the bottom (or top) edge of the display window 40. Alternately, when the cursor 42 is moved onto either of the bottom end B1, B2 of one of the first and second boarder floating structures 30 and 32, the page is automatically scrolled down (or up) to bring within the field of view the content of the page that extends above (or below) the bottom edge of the display window 40.

In an alternate embodiment, only one of these paired structures 30 and 32 are needed. Having both structures 30 and 32 brings added convenience to the user/viewer to choose for using the structure that is closer to the present cursor position.

Furthermore, placing the cursor 42 on either of the right-side end R1, R2 of one of the third and fourth boarder floating structures 34 and 36, would automatically scroll the page to the right (or left) to bring within the field of view the content previously beyond the left (or right) edge of the display window 40. Placing the cursor 42 on either of the left-side end L1, L2 of one of the third and fourth boarder floating structures 34 and 36, would automatically scroll the page to the left (or right) to bring within the field of view the content previously beyond the right (or left) edge of the display window 40.

Alternately or in-addition, the GO/STOP/PAGE/CONTINUOUS and SLOW DOWN and SPEED UP functions can be implemented with any desired/appropriate symbols or conventions. In the exemplary embodiment, a floating scrolling tool 42 is provided. The floating scrolling tool 49 includes a go button 43, stop button 44, page button 45, slower button 47 and faster button 48. The floating scrolling tool 49 is a user control tool implemented as an embodiment of this invention. It remains in view while the page content is scrolled through the viewing field.

The operation of the floating scrolling tool 49 will now be described. The go button 43 when clicked begins the automatic scrolling. The stop button 44 when clicked stops the automatic scrolling. The page button 45 when clicked advances the window to display the next full-page that is currently just out of the field of view. The continuous button 46 when clicked resumes the automatic scrolling from the current position. The go button 43 serves the same function, thus button 46 can be eliminated. Since people normally read in one direction, downward; and when there was no content beyond the left and right edges of the field of view, directionality need not be shown. However, if the page requires right and left directionality, directional buttons may be substituted for the single go button 43. Finally, the slower button 47 decreases the scrolling speed while the faster button 48 increases the scrolling speed.

The automatic scrolling is automatically stopped when the cursor 42 is moved away from the top ends T1, T2, bottom ends B1, B2, left-side ends L1, L2, and right-side ends L1, L2. Moreover, the automatic scrolling is automatically paused at every full-screen or full-window shift. When the scrolling is paused at a full-screen or full-window shift, the automatic scrolling can be resumed in the direction of the previous scrolling by clicking the left key of a mouse while the cursor 42 is still on a respective one of the ends.

Accordingly the automatic scrolling is essentially continuous within a full-screen or full-window shift, unless stopped by moving the cursor 42. Furthermore, scrolling can be programmed to automatically stops at the end of the content or page, to be resumed by clicking on a respective end for looping or reversing, or clicking on the go button 43 or continue button 46. It can also be programmed to loop after pausing, until the user clicks on a link to go else where in the information repository, or an automated link-activation sequence brings new pages to the browser The speed of the scrolling can also be controlled using an input device or mouse. For example, "clicking" the left button of the "mouse" (input device) while the cursor 42 is at an end would increase the speed of the automatic scrolling in the direction designated by the end. Moving the cursor 42 away from the top, bottom, left or right ends along and on a respective structure 30, 32, 34 or 36 would decrease the scrolling speed.

Figure 3:
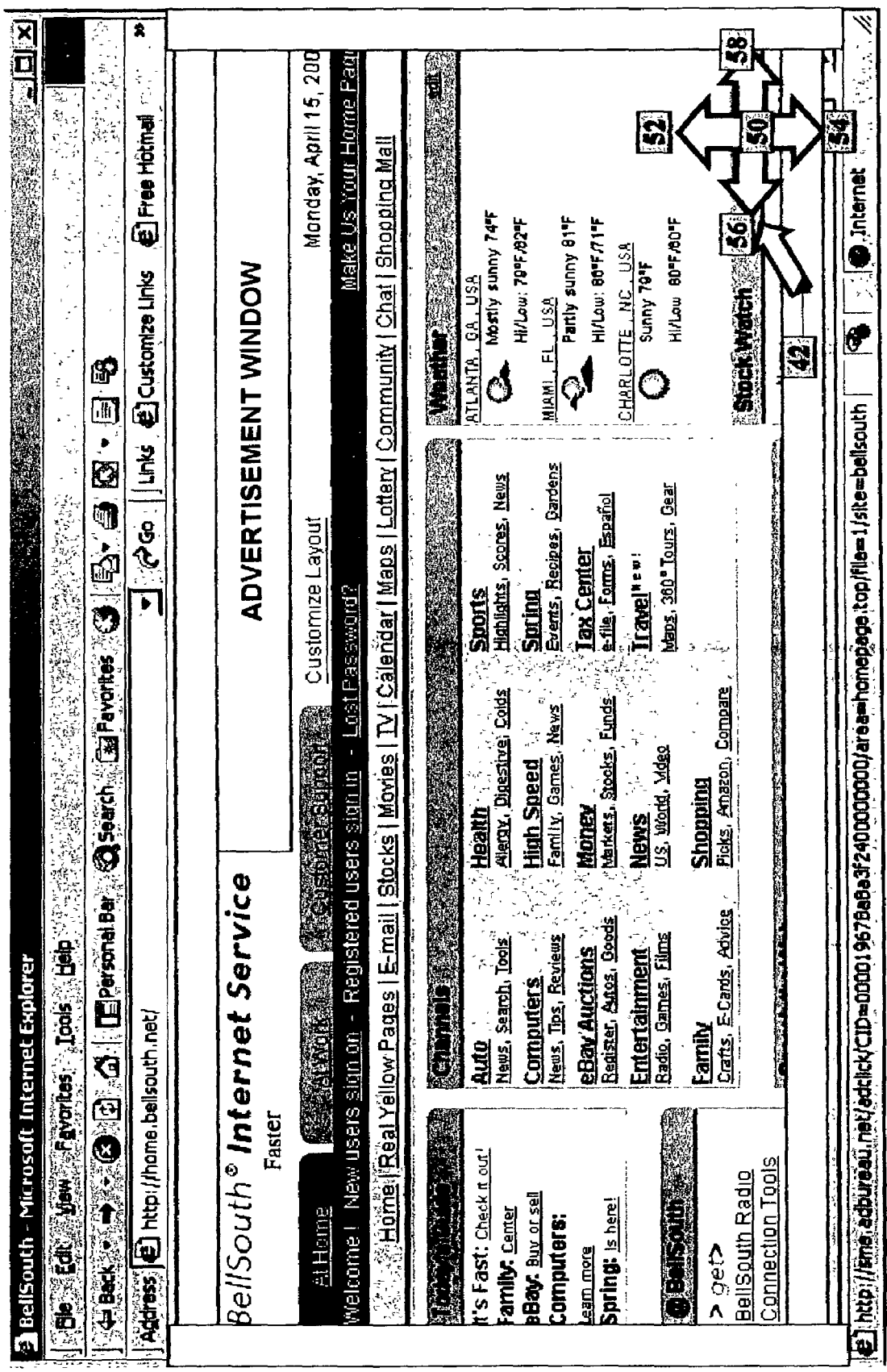
FIG. 3 illustrates an alternate embodiment of the browser, in accordance with the present invention, in combination with a page.

Referring now to FIG. 3, the user-control vehicle of the automatic scrolling of the present invention can also be implemented with a cluster of arrows 50 at one location. The cluster of arrows 50 includes an up arrow 52, a down arrow 54, a left arrow 56 and a right arrow 58. By placing the cursor 42' on a respective arrow, the content would shift at the direction of such arrow.

As can be appreciated, the present invention provides for automated scrolling within a display window 40 without the continual strain and motion of the fingers and hand that is required using the conventional "scroll bars" in browsers.

Figure 4A:
FIGS. 4A-4G illustrate examples of the separately controllable autoscrolling features in between the main page and sub-windows.
Figure 4B:

Referring now to FIGS. 4A-4G, examples of the auto-scrolling features of the present invention with multiple windows are illustrated. FIGS. 4A and 4B illustrate a main page 60 having a plurality of navigation links 62 at the top of the main page 60, to the left of the Christmas tree, and within the graphics. The navigation links 62 provide for navigation such as via HTML links within a website. The main page 60 includes sub-window partitions that form a pair of columns 70 and 72 that cover part of the field of view of the main page 60. Additionally, the main theme of the content 60a is provided to the left of the pair of columns 70 and 72.

For exemplary purposes, the pair of columns 70 and 72 is depicted as advertisement display sub-windows. Nevertheless, the main page 60 may have any number of sub-window partitions that may be vertically or horizontally oriented, or cut into random areas of the main content. The right column 72 of the advertising display and the main content area 60a are stationary while the left column 70 is automatically scrolling.

As can be appreciated, the present invention can be used to automatically scroll partitioned information apart from a browser/web, or TV/Video's main content, such as financial market news and summaries, weather reporting, special features, sports news, movie previews, special stories, or advertisements.

Figure 4C:

Referring now to FIGS. 4A and 4C, the main page 60a and the right column 72 are automatically scrolled in synchronization with 60a, or can be manually scrolled using the conventional browser scroll bar 16 or the vertical scroll arrows 16a and 16b along with 60a. The left column 70 continues to automatically scroll independently of the main page 60a and the right column 72.

Figure 4D:
Figure 4E:
Figure 4F:
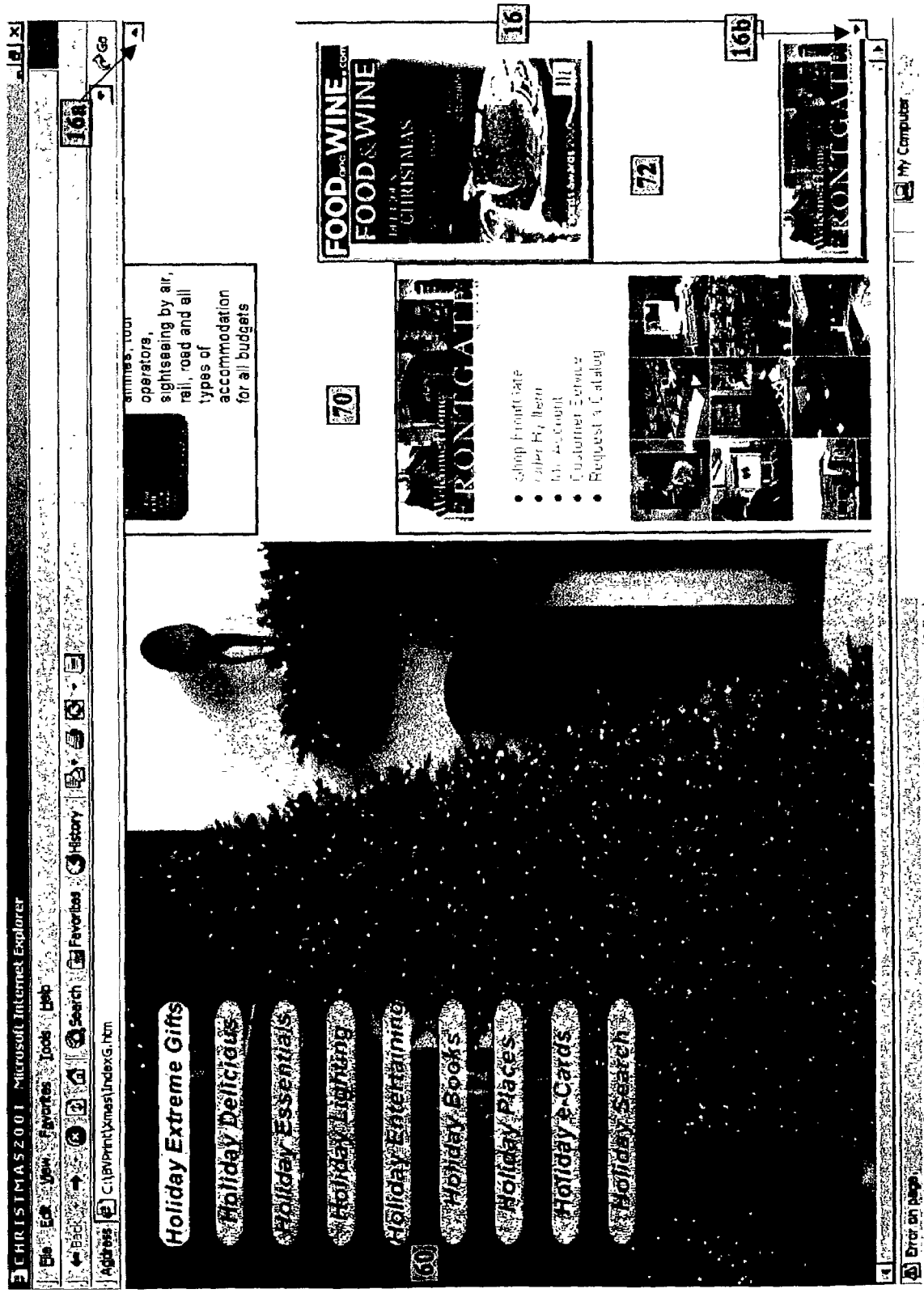
Figure 4G:
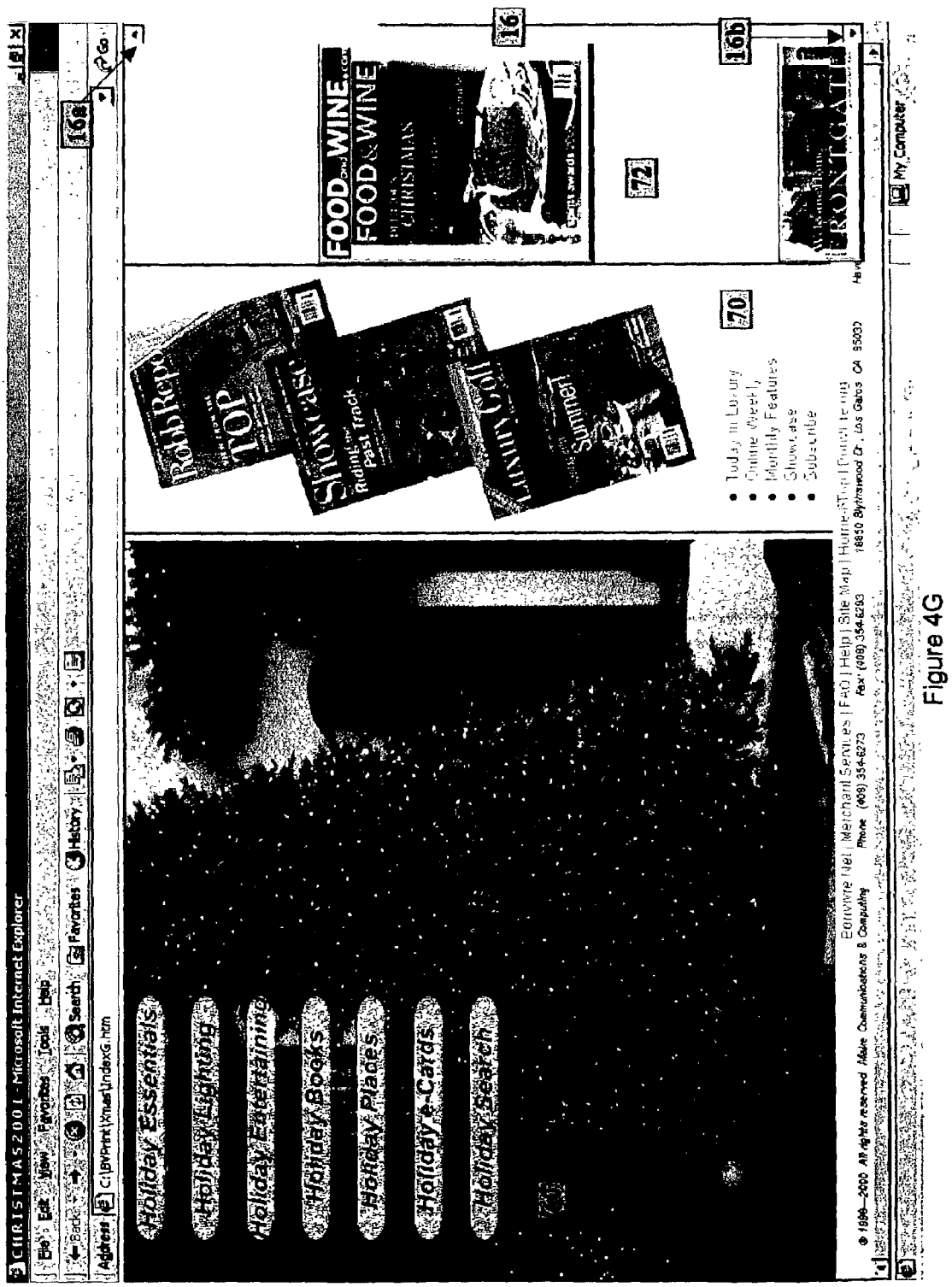

FIGS. 4D and 4E illustrates the left column 70 is automatically scrolling independently. The right column 72 is floating independently inview, while—the X-tree may be auto scrolled or manually scrolled independent of column 70 and 72.

Referring now to FIGS. 4D and 4E, the main page 60a and the left column 70 may be each independently automatically scrolled at different speeds. For example, the main page 60 is automatically scrolled at a first speed while the left column 70 is scrolled at a second speed higher than the first speed. The right column 72 remains stationary or floating in view.

It should be noted, the scrolling within the main page 60, 60a, left column 70 and/or the right column 72 can be effectuated using the first, second, third and fourth boarder floating structures 30, 32, 34 and 36 described in detail above. Additionally or alternatively the floating scrolling tool 49 may be provided. The columns 70 and 72 are for advertisement in the exemplary embodiment, such columns do not generally require scrolling control. However, for sub-windows that display weather reports, stock quotes, feature stories, etc., the floating scrolling tool 49 may be incorporated.

The pair of columns (sub-windows) 70 and 72 do not need to be separated in columns from the remainder of the browser main page 60. They can be cut-ins within the main page 60 as shown in FIG. 2, or overlap the main page, as shown in FIGS. 5A, 5B, 5C, 5D, 5E, 5F.

Figure 5A:
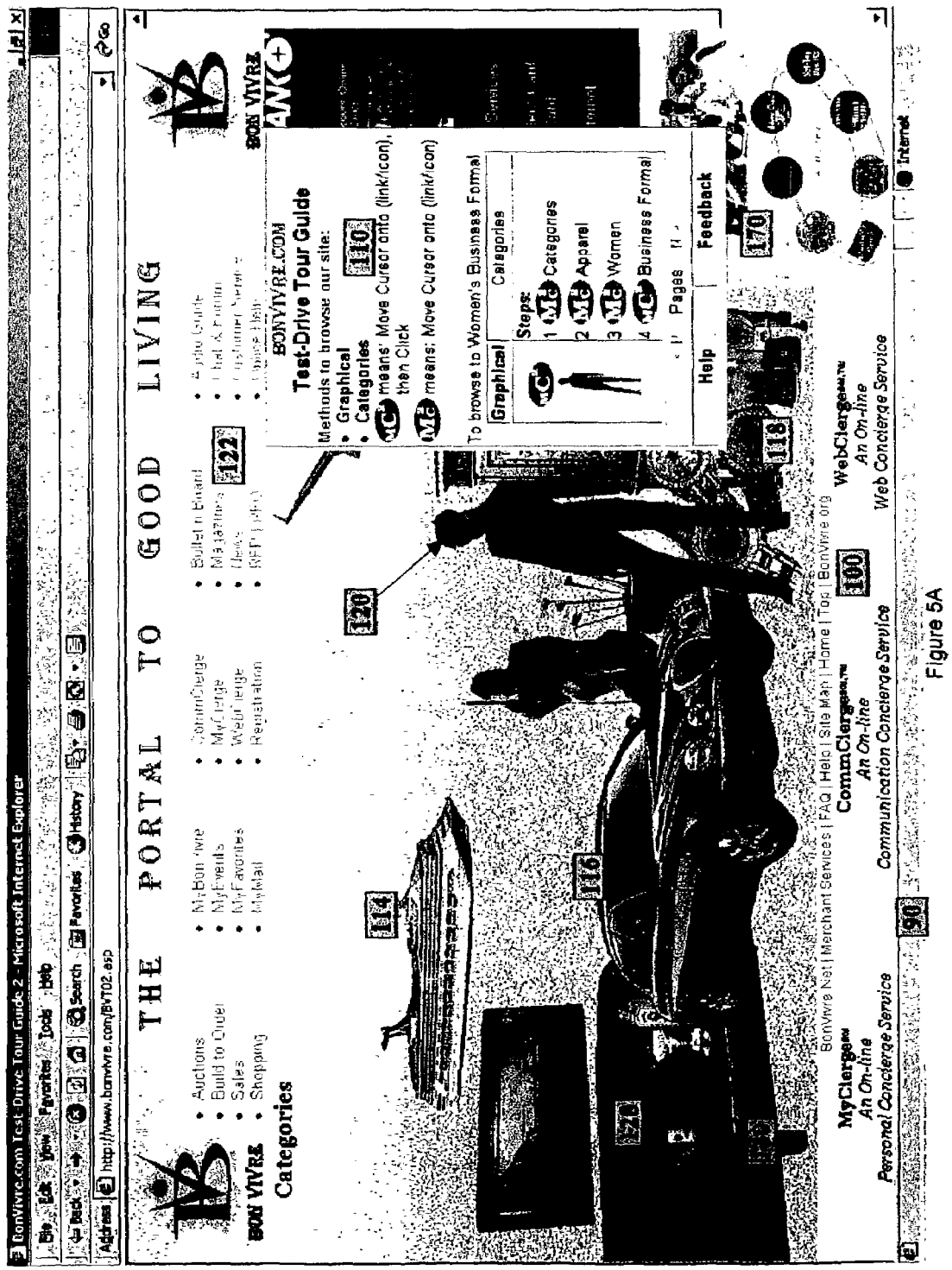

Referring now to FIGS. 5A-5F, the present invention is applied to creating a Tutorial/Guide to a new dynamic push/pull, active/interactive website. FIGS. 5A, 5B, 5C, 5D, 5E, and 5F illustrate that instructions for users/viewers are contained in a floating instruction box 110 overlapping the field of view of the browser's main window 90. The content of the main pages are automatically and continually scrolled through the field of view of the browser window 90. The present invention uses sequences of preprogrammed, automatic activation of links to automatically retrieve the additional linked information, and scroll, present, and "push" such automatically retrieved information continually to the user/viewer as shown in FIGS. 5C, 5D, 5E. The "link" (HTML, XML, DTML, etc.) that is to be automatically activated would "blink" (highlighted or emphasized in a manner to call attention directly thereto) before activation. All links contained in the scrolled pages, as well as in the floating "instruction box" are functional, ready to receive user/viewer action/input or selection.

FIGS. 5A, 5B, 5C, 5D, 5E and 5F illustrate an application of the presents invention in a Tutorials/Guide environment, where instructions for the user's action relevant to the displayed information/page is contained in a floating instruction box 110 while the content of the Tutorial/Guide (as conveyed by the illustrations and text content) is automatically scrolled through the browser window 100. Any sequence of links (HTML, XML links, DTML links, or other links that can be clicked to navigate to a different page) are pre-programmed to be automatically invoked or activated to retrieve (navigate to) the linked information, to scroll, present, and "push" to the user, even if the user does nothing. All links contained in the scrolled pages, as well as, in the floating instruction box 110 are functional to receive the user's input or selection.

In the preferred embodiment, links in the pages are preprogrammed to flash and are activated automatically. When activated, the link's resulting information is displayed (navigated to), automatically scrolled and pushed to the viewer. In the exemplary embodiment, the graphical images of the cruise ship 114, vehicle 116, watches 118, a dressed women 120, etc. are links. Everything displayed can be a link including: the airplane 124, the man 126, the wine 128, the table 130, the picture 132, the furniture 134, even the background is a link to something. All of these links are active and functional while scrolled, and all and any of these links can be pre-programmed into automated activation sequences. Moreover, most text phrases or words are navigational links, such as word phrases 122.

When a cursor is placed on a link—whether it is an image, a part of an image, or text, there is a small dialog box (NOT SHOWN) that shows up to describe the link. In the exemplary illustrations, the link flashed and automatically activated is the dressed woman 120 in a rather formal but slick business dress in 5A and 5B, that results in the appearance/display and scrolling of FIGS. 5C, 5D, and 5E.

Additionally, the floating instruction box 110 includes a graphical icon 120a of that same picture of the dressed woman 120, instructing or alluring the user to move the cursor onto the graphical women icon 120a and click. The automated feature of the link navigates the user to the women's business formal section.

The floating instruction box 110 contains instructions regarding what to do, and contains active links 132, 134, 136 and 138 to navigate to additional information. The help button 140 provides access to additional instructions. The feedback button allows the user to provide feedback. The "floating" feature of the floating instruction box 110 allows such box to be within view so that it can be accessed anytime as the main pages 100 are scrolled. It can also be "double clicked" out of view, or "double clicked" back into view, or controlled by any desirable control symbol or convention, such as the standard "-" window-minimizing icon in Microsoft applications. As the user interacts with the instructions in the floating instruction box 110, a new page is displayed (navigated to) and new instructions relevant to such new page appear in the floating instruction box 110, so that the user does not have to go else where to look for help/guide/instruction material.

All of the educational or help/guide/instructional material has instructions at a certain place on a page, or even previous pages. Therefore, when the user wants to look at it again, the user can scroll or page back to where the instruction was—if it is remembered where it was seen, and lose the place where you are actually working on, and needing those damned (are you sure you want to use this word here?) instructions that was way back where you don't remember.

The floating instructional box 110 further includes <P Pages N> for moving to previous or next pages when the <P or N> is clicked.

In the exemplary embodiment, if the user clicked on the graphical women icon 120a, FIGS. 5C, 5D and 5E may commence. The women icon 120a in the floating instructional box 110 is just a replicate of the women 120 in the page 100—representing women's business clothes. However, if the women 120 was dressed in ball gowns, prom or formal wear, it would be associated with the navigational link associated therewith. The "Steps" in the Categories section of the floating instruction box 110 allows the user to navigate to any sub category desired.

Figure 5B:
Figure 5C:
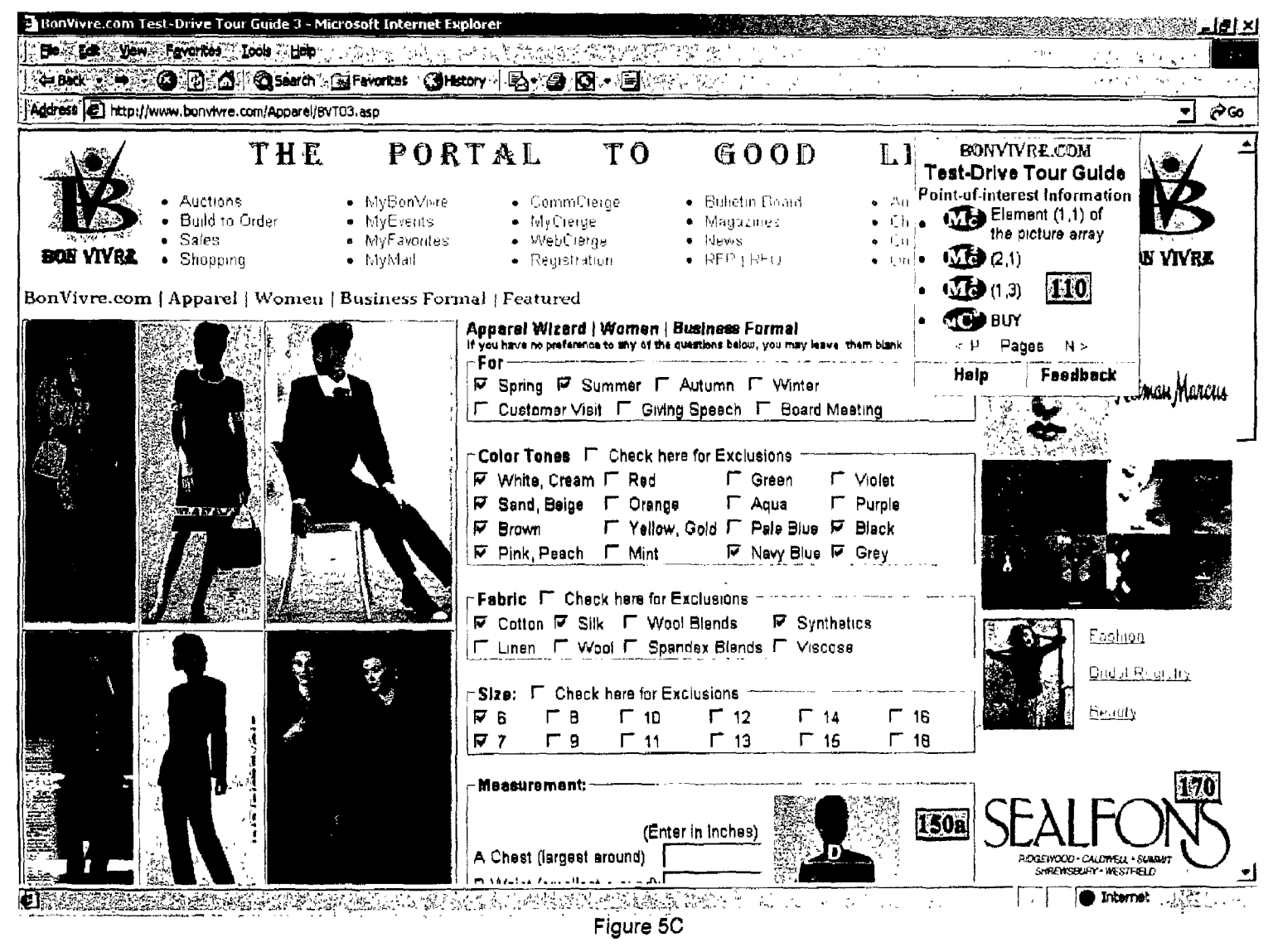
Figure 5D:
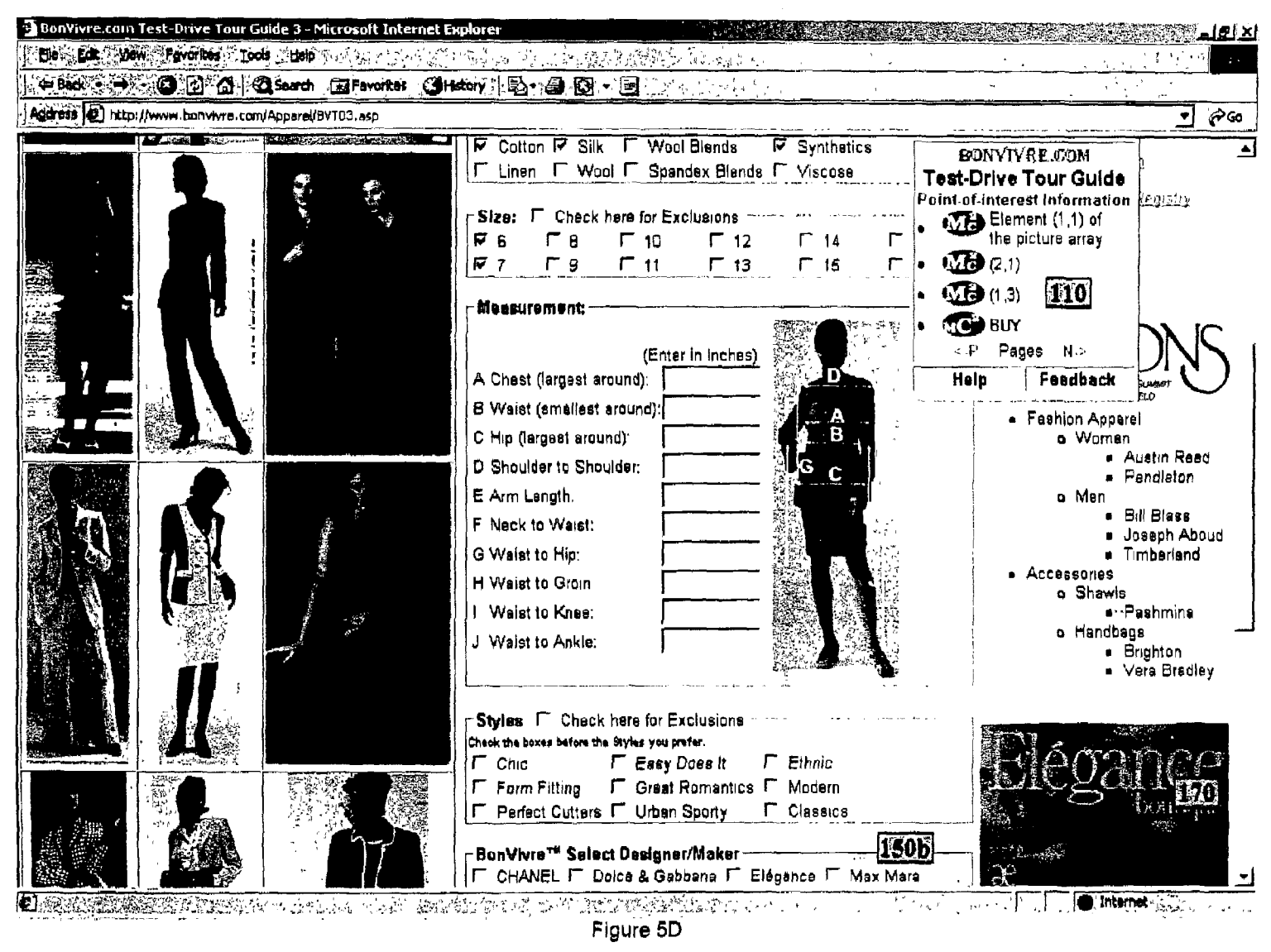
Figure 5E:
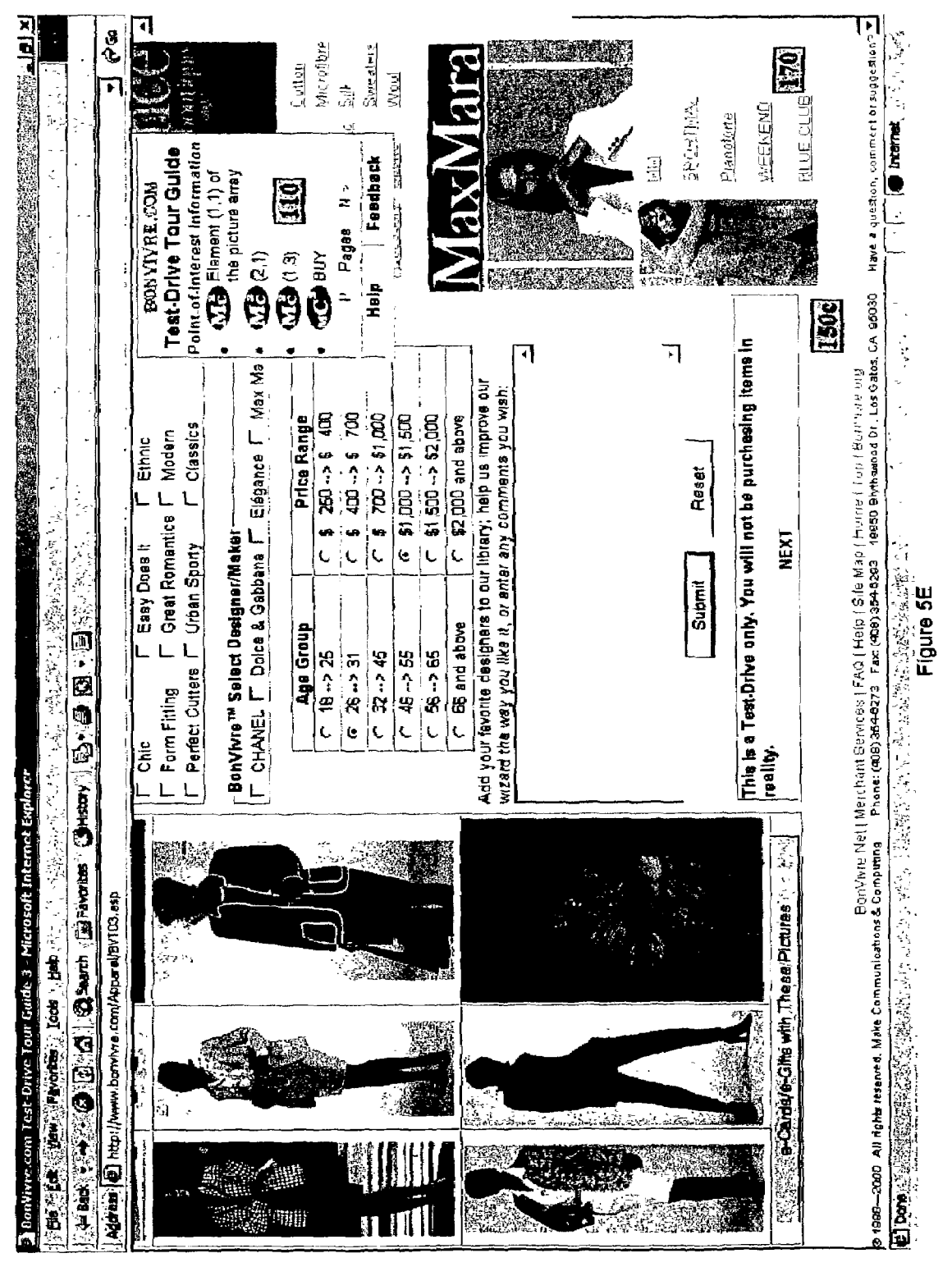

It should be noted the primary difference in FIGS. 5A and 5B is that the main page 100 is scrolling.

Referring now to FIGS. 5C, 5D and 5E, these figures represent the pages or part of pages 150a, 150b, 150c for navigating through the women's business apparel. The primary difference in these figures is that the pages are automatically scrolling thus the women's business apparel is "pushed" and presented to the user. The floating instruction box 110' remains essentially stationary. The user can select various elements in the displayed selection array to see additional information, or to buy something. The illustrations of FIGS. 5C, 5D and 5E illustrates that the website pages actively "push" the content to the viewer. In other words, the website actively navigates for the user and does not sit still waiting for the user's input before any navigation commences.

Figure 5F:
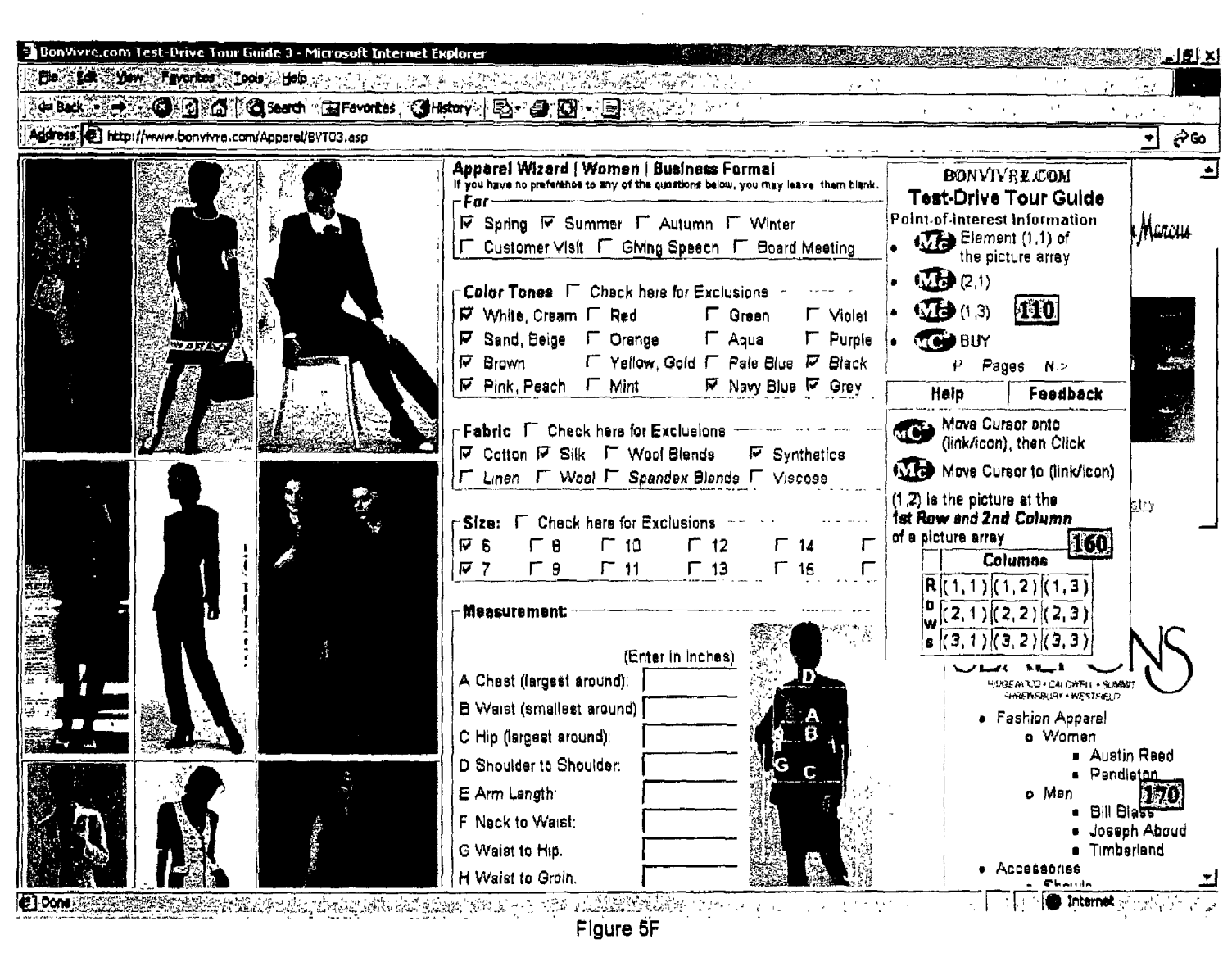
Figure 5G:
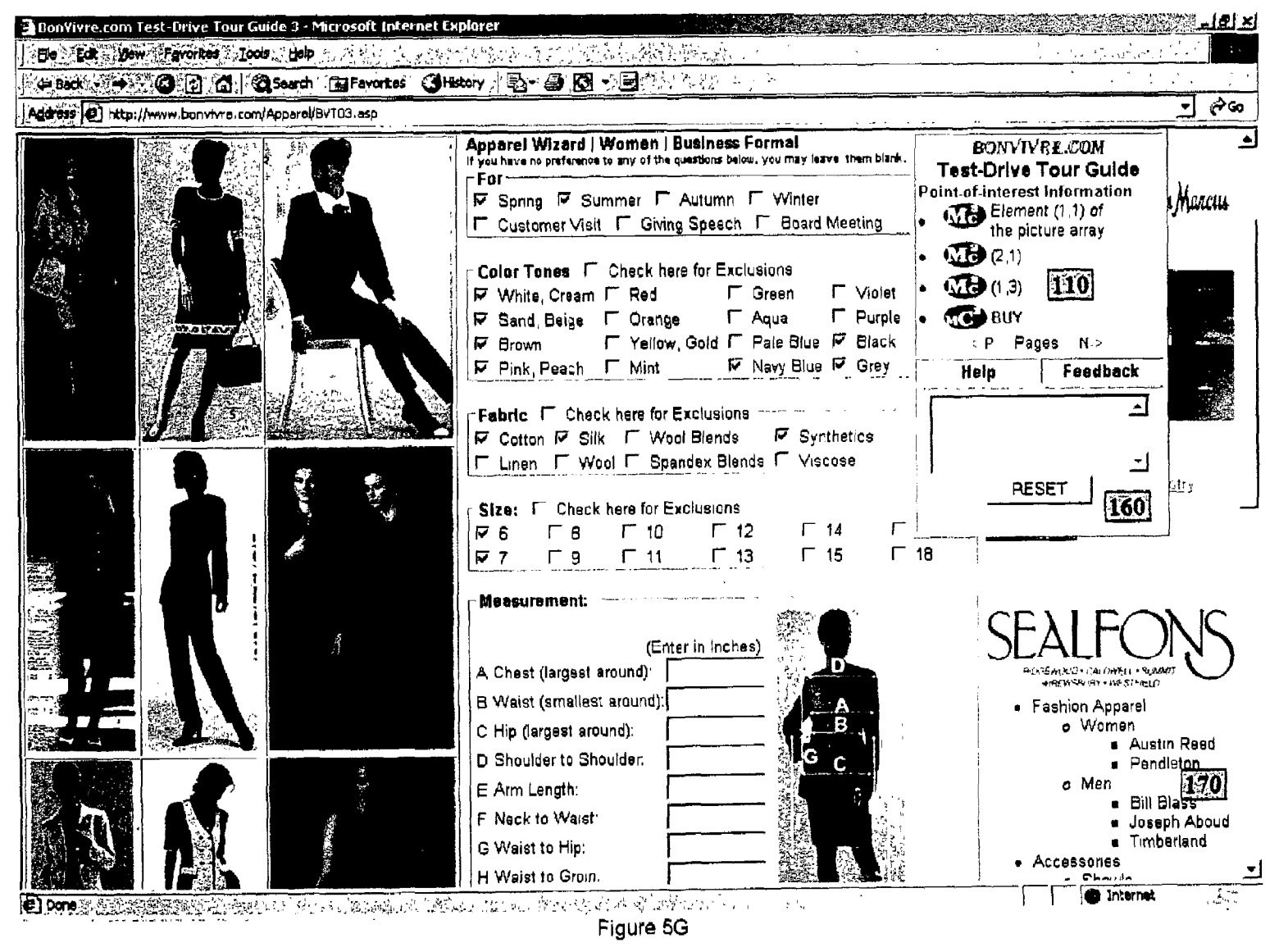

FIG. 5F illustrates the floating instruction box 110' when the help button 140 is clicked. The floating instruction box 110' includes a drop down dialog box 160 to explain the arrangement of the page.

FIGS. 5A-5F include a sub-window 170 that can be continuously scrolled automatically independently of the main window of the pages 100, 150a, 150b and 150c.

The present invention also provides a mechanism to make the otherwise passive browser/web media active and interactive, and TV/Video media interactive, enabling both media with pushing and pulling functions.

As can be appreciated, the present invention provides a method of automatically displaying and navigating through a media, whether TV/Video or Computer/Browser; and, automatically scrolling the content to push and allure navigation through the media.

The website exemplified in FIGS. 5A through 5F has multiple categories wherein each category has multiple sub-categories. The method provides for displaying a floating dynamic instruction box 110, 110' overlaid on the page that displays navigational links for alluring the user to further navigate to a category or to a sub-category.

The page 100 is a website home page. The page 100 includes at least one blinking picture or link. The method dynamically changes the floating dynamic instruction box 110, 110' in response the at least one blinking picture to entice the user to further navigate.

Accordingly, the method automates sequences of blinking links in a page; and activates the blinking links of the sequences to automatically and sequentially push navigation within the website. The sequences may be programmed based on a user's demographics or profile, or any other suitable criteria.

The pages 100, 150a, 150b and 150c include a subwindow 170. The subwindow 170 can be automatically scrolled independently of the main window of pages 100, 150a, 150b and 150c.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed is:

1. A method of automatically scrolling comprising the steps of:
    (a) placing a cursor on a respective end of a floating border structure;
    (b) in direct response to step (a), automatically scrolling through content extending beyond a display window into a field of view of the display window in a predetermined direction designated by the end, wherein the step of automatically scrolling continues to be performed without user input;
    (c) during the step (b). determining if a full-screen shift of the content has occurred;
    (d) in response to the sten (c) automatically Pausing the step (b);
    (e) after Lhe step (d), clicking a left key of a mouse; and
    (f) in response to the sten (e), resuming the sten (b).

2. The method according to claim 1, wherein:
    the floating border structure has a top end and a bottom end; and
    the step (b) includes:
        when the respective end is the top end, the content is automatically scrolled down to bring the content within the field of view; and,
        when the respective end is the bottom end, the content is automatically scrolled up to bring the content within the field of view.

3. The method according to claim 2, wherein the floating border structure has a right-side end and a left-side end; and
    wherein the step (b) further includes the steps of:
        when the respective end is the right-side end, the content is automatically scrolled left to bring the content within the field of view; and
        when the respective end is the left-side end, the content is automatically scrolled right to bring the content within the field of view.

4. The method according to claim 1, comprising the steps of:
    (g) moving the cursor away from the respective end; and
    (h) directly in response to the step (g), automatically stopping the step (b).

5. The method according to claim 1, wherein the display window is a browser window, and the content is a page.

6. The method according to claim 1, wherein the floating border structure is a floating line or floating box.

7. The method according to claim 1, further comprising the steps of activating a user control to perform one of: begin automatic scrolling, stop automatic scrolling, advance scrolling a page, increase scrolling speed and decrease scrolling speed.

8. A computer configured to display a browser display window having a field of view, the browser display window comprising:

a first floating border structure having first and second ends oriented in a vertical plane for effectuating automatic scrolling vertically through content within the field of view in direct response to a cursor being placed on a respective one of the first and second ends, wherein automatically scrolling vertically is effectuated continuously without user input; and a second floating border structure having third and fourth ends oriented in a horizontal plane for effectuating automatic scrolling horizontally through content within the field of view in direct response to the cursor being placed on a respective one of the third and fourth ends, wherein automatically scrolling horizontally is effectuated continuously without user input;

wherein the content is a page, wherein the page comprises at least one link to additional linked information, and wherein the computer is further configured to automatically retrieve and display the additional linked information when the user does nothing.

9. The computer according to claim 8, wherein, the first floating border structure has a top end and a bottom end such that when the respective end is the top end, the content is automatically scrolled down to bring the content within the field of view, and when the respective end is the bottom end, the content is automatically scrolled up to bring the content within the field of view.

10. The computer according to claim 9, wherein:
the second floating border structure has a right-side end and a left-side end;
when the respective end is the right-side end, the content is automatically scrolled left to bring the content within the field of view; and
when the respective end is the left-side end, the content is automatically scrolled right to bring the content within the field of view.

11. The computer according to claim 8, wherein each floating border structure of the first and second floating border structures is a floating line.

12. The computer according to claim 8, wherein each floating border structure of the first and second floating border structures is a floating box.

13. The computer according to claim 8, wherein the automatic scrolling is limited to a full-screen shift.

14. The computer according to claim 8, wherein the automatic scrolling is automatically stopped when the cursor is moved away from the first floating border structure or the second floating border structure.

15. The computer according to claim 8, wherein the browser display window is a main display window, the computer being further configured to display a second display window having a second field of view within the main display window, the second display window comprising:
a first floating sub-border structure having first and second ends of the first floating sub-border structure oriented in a vertical plane for effectuating automatic scrolling vertically through content within the second field of view in direct response to the cursor being placed on a respective one of the first and second ends of the first floating sub-border structure; and
a second floating sub-border structure having third and fourth ends of the second floating sub-border structure oriented in a horizontal plane for effectuating automatic scrolling horizontally through content within the second field of view in direct response to the cursor being placed on a respective one of the third and fourth ends of the second floating sub-border structure.

16. A computer configured to display a browser display window having a field of view, the browser display window comprising:
a first floating border structure having first and second ends oriented in a vertical plane for effectuating automatic scrolling vertically through content within the field of view in direct response to a cursor being placed on a respective one of the first and second ends, wherein automatically scrolling vertically is effectuated continuously without user input; and
a second floating border structure having third and fourth ends oriented in a horizontal plane for effectuating automatic scrolling horizontally through content within the field of view in direct response to the cursor being placed on a respective one of the third and fourth ends, wherein automatically scrolling horizontally is effectuated continuously without user input;
wherein the browser display window further comprises a plurality of autoscrolling controls, the plurality of autoscrolling controls including:
a go button for beginning automatic scrolling and resuming automatic scrolling from current position when the go button is clicked;
a stop button for stopping automatic scrolling when the stop button is clicked;
a page button for advancing the window to display next full-page that is out of the field of view when the page button is clicked;
a slow down button for decreasing automatic scrolling speed when the slow down button is clicked; and,
a speedup button for increasing automatic scrolling speed when the speedup button is clicked.

17. A method of displaying and navigating through a website wherein the website has multiple categories wherein each category has multiple sub-categories, comprising the steps of:
displaying on a display of a computer a page of the website;
during the displaying step, automatically scrolling the page while the user of the computer does nothing;
displaying a floating dynamic instruction box overlaid on the page that displays navigational links for alluring the user to further navigate to a category or to a sub-category, the floating dynamic instruction box remaining stationary on the display.

18. The method according to claim 17, wherein the page is a website home page.

19. The method according to claim 17, wherein the page includes at least one blinking picture or link; and
further comprising the step of:
dynamically changing the floating dynamic instruction box in response to the at least one blinking picture to entice the user to further navigate.

20. The method according to claim 17, wherein the page includes at least two independent windows.

21. The method according to claim 20, further comprising the step of automatically scrolling independently the at least two independent windows.

22. The method according to claim 20, further comprising the steps of:
automatically scrolling a first one of the at least two independent windows at a first speed; and,
automatically scrolling a second one of the at least two independent windows at a second speed different from the first speed.

23. The method according to claim 20, further comprising the steps of:
    manually scrolling a first one of the at least two independent windows; and,
    continuously, automatically scrolling a second one of the at least two independent windows.

24. A method of displaying and navigating through a website comprising the steps of:
    displaying on a display of a computer a page of the website;
    during the displaying step, automatically scrolling the page while the user of the computer does nothing;
    automating sequences of blinking links in the page; and,
    activating the blinking links of the sequences to automatically and sequentially retrieve additional information linked by the blinking links and present the additional information on the display, thereby pushing navigation within the website.

25. The method according to claim 24, wherein the sequences are based on user demographics or profile.

26. An apparatus for displaying and navigating through a website, the apparatus comprising a computer configured to perform steps comprising:
    displaying on a computer display a browser window having a field of view for displaying a webpage of the website within the field of view; and
    automatically scrolling the webpage in response to placement of a cursor on a floating structure displayed on the display to push and allure navigation through the website, wherein the step of automatically scrolling continues to be performed when the user of the computer does nothing;
    wherein the website has multiple categories wherein each category has multiple sub-categories, the computer being further configured to display a floating dynamic instruction box overlaid on the webpage, the floating dynamic instruction box displaying navigational links for alluring the user to further navigate to a category to a sub-category, the floating dynamic instruction box remaining stationary on the display.

27. The apparatus according to claim 26, wherein the webpage is a website home page.

28. The apparatus according to claim 26, wherein:
    the webpage includes at least one blinking picture or link;
    the computer is further configured to implement means for dynamically changing the floating dynamic instruction box in response to the at least one blinking picture or link to entice the user to further navigate.

29. The apparatus according to claim 26, further comprising:
    means for automating sequences of blinking links in the webpage; and
    means for activating the blinking links of the sequences to automatically and sequentially retrieve additional information linked by the blinking links and present the additional information on the display, thereby pushing navigation within the website.

30. The apparatus according to claim 26, wherein the webpage includes at least two independent windows.

31. The apparatus according to claim 30, wherein the at least two independent windows are automatically scrolled independently.

32. The apparatus according to claim 30, wherein:
    a first one of the at least two independent windows is automatically scrolled at a first speed; and
    a second one of the at least two independent windows is automatically scrolled at a second speed different from the first speed.

33. The apparatus according to claim 30, further comprising:
    means for manually scrolling a first one of the at least two independent windows; and
    means for continuously, automatically scrolling a second one of the at least two independent windows.

* * * * *

UNITED STATES PATENT AND TRADEMARK OFFICE
CERTIFICATE OF CORRECTION

PATENT NO. : 7,308,653 B2
APPLICATION NO. : 10/052692
DATED : December 11, 2007
INVENTOR(S) : Catherine Lin-Hendel It is certified that error appears in the above-identified patent and that said Letters Patent is hereby corrected as shown below:

Column 8, line 25, cancel "(b)." and replace the cancelled text with --(b),--;

Column 8, line 27, cancel "sten (c) automatically Pausing" and replace the cancelled text with --step (c) automatically pausing--;

Column 8, line 29, cancel "Lhe step" and replace the cancelled text with --the step--;

Column 8, line 30, cancel "sten (e), resuming the sten (b)." and replace the cancelled text with --step (e), resuming the step (b).--;

Column 8, line 50, cancel "claim 1, comprising" and replace the cancelled text with --claim 1, further comprising--;

Column 11, line 38, cancel "navigate to a category to" and replace the cancelled text with --navigate to a category or to--.

Signed and Sealed this

Third Day of June, 2008

JON W. DUDAS
*Director of the United States Patent and Trademark Office*